No. 872,748. PATENTED DEC. 3, 1907.
L. D. PUTNEY.
PLUMBER'S TOOL.
APPLICATION FILED JAN. 14, 1907.
2 SHEETS—SHEET 1.
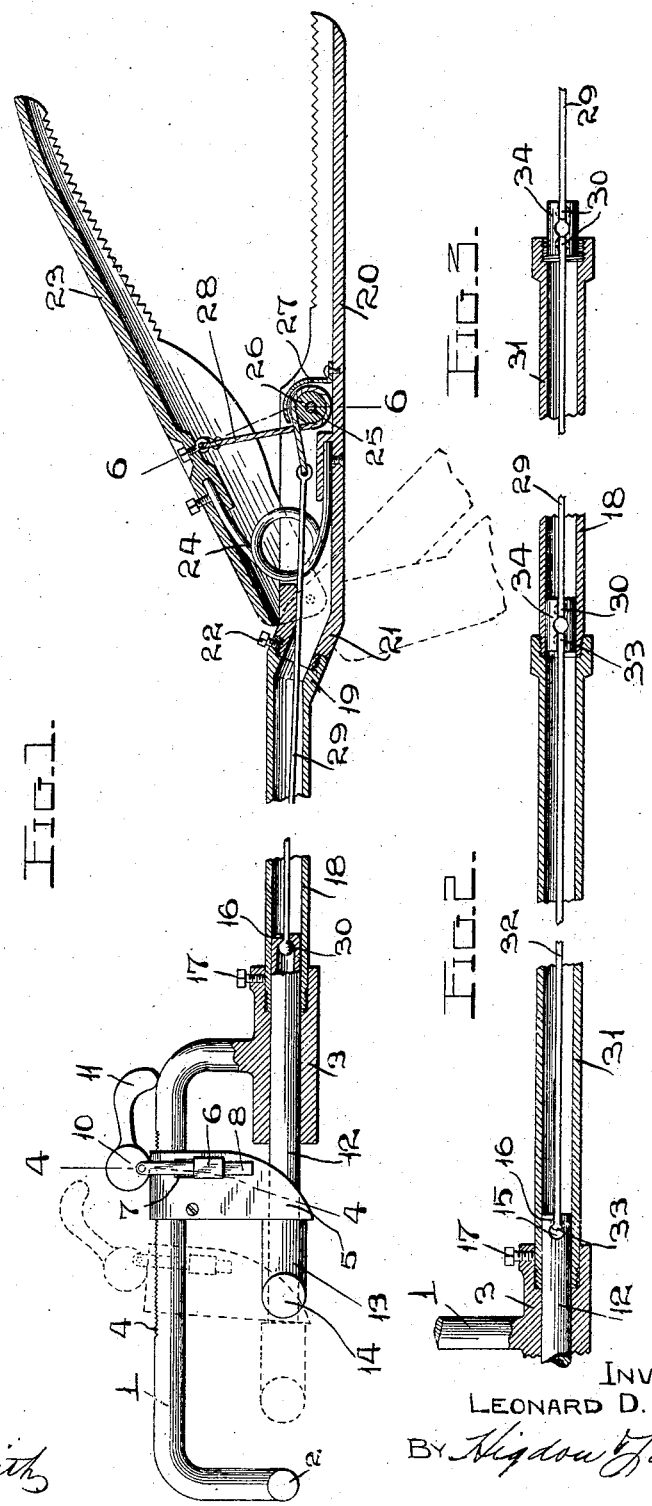
ATTEST.
H. J. Fletcher
M. P. Smith
INVENTOR.
LEONARD D. PUTNEY.
By Higdon & Longan
ATT'YS.

No. 872,748. PATENTED DEC. 3, 1907.
L. D. PUTNEY.
PLUMBER'S TOOL.
APPLICATION FILED JAN. 14, 1907.
2 SHEETS—SHEET 2.
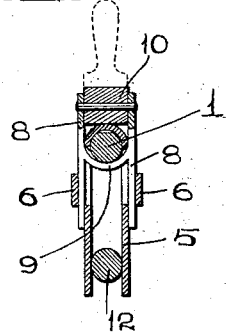
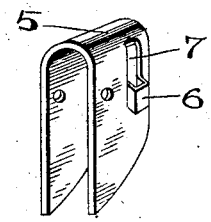
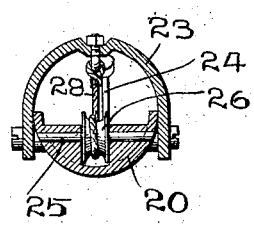
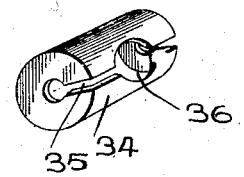
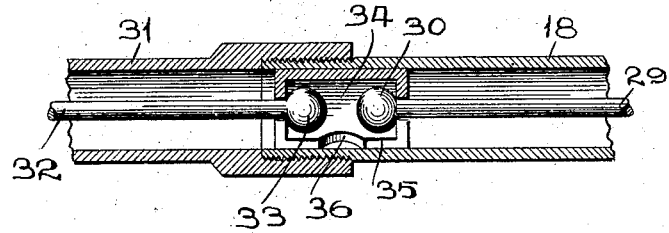
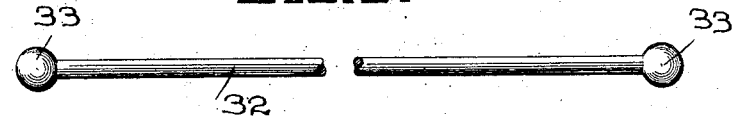
ATTEST.
H. J. Fletcher.
M. P. Smith.
INVENTOR.
LEONARD D. PUTNEY.
BY Higdon & Longan.
ATT'YS.
THE NORRIS PETERS CO., WASHINGTON, D. C.

UNITED STATES PATENT OFFICE.

LEONARD D. PUTNEY, OF ST. LOUIS, MISSOURI.

PLUMBER'S TOOL.

No. 872,748.  Specification of Letters Patent.  Patented Dec. 3, 1907.

Application filed January 14, 1907. Serial No. 352,328.

To all whom it may concern:

Be it known that I, LEONARD D. PUTNEY, a citizen of the United States, and resident of St. Louis, Missouri, have invented certain new and useful Improvements in Plumbers' Tools, of which the following is a specification containing a full, clear, and exact description, reference being had to the accompanying drawings, forming a part hereof.
My invention relates to a plumber's tool, which is particularly adapted for use in removing obstructions, such as stones, from stop boxes, sewer vents, and pipes.

My invention consists in an elongated handle, a pair of jaws at one end thereof, and means arranged at the opposite end for manipulating said jaws and locking them in a closed position when they grip an object.

To the above purposes, my invention consists in certain novel features of construction and arrangement of parts, which will be hereinafter more fully set forth, pointed out in the claims, and illustrated in the accompanying drawings, in which:—
Figure 1 is a longitudinal section taken through the center of a tool of my improved construction; Fig. 2 is a vertical section taken through the center of an extension member used in connection with my improved tool; Fig. 3 is a detail section of one end of the extension member, and showing a connection for a wire which passes through the tubular handle and extension member of the tool; Fig. 4 is a vertical section taken on the line 4—4 of Fig. 1; Fig. 5 is a perspective view of an adjustable stop which is mounted on the handle of the tool; Fig. 6 is a cross section taken approximately on the line 6—6 of Fig. 1; Fig. 7 is a perspective view of a tubular connection for the meeting ends of the wires which pass through the handle of the tool; Fig. 8 is an enlarged detail section showing the tubular connection in position within the tubular handle, and the ends of the wires in said tubular connection; Fig. 9 is an enlarged elevation of one of the wires made use of in my improved tool.

Referring by numerals to the accompanying drawings:—1 designates the handle of my improved tool, the rear end of which is provided with a cross bar 2, and the forward end being provided with an integral sleeve 3. A portion of the top of the handle 1 is notched, as designated by 4, and positioned on said notched portion of the handle is an inverted U-shaped stop 5, with the sides of which are formed integral loops or keepers 6; and immediately above said loops are formed apertures 7.

Arranged to slide loosely through the loops 6 are fingers 8, which are connected by a cross bar 9, which passes through the apertures 7, and pivotally arranged between the upper ends of the fingers 8 is an eccentric 10, provided with a handle 11, which eccentric is adapted to bear on top of the stop 5, and to draw the cross bar 9 against the under side of the handle 1, thus locking the stop at any point on the notched portion of said handle. Arranged to slide freely through the sleeve 3 is a short tube 12, the rear end of which passes between the lower ends of the stop 5, and formed integral with the rear end of said tube is a collar 13, provided at its rear end with a cross bar 14. Formed through the forward end of the tube 12 is an aperture 15, and connecting the same with the forward end of said tube is a longitudinally disposed slot 16, which slot and aperture are for the reception of the rear end of a wire, (hereinafter described). Detachably fixed in the forward end of the sleeve 3 and held by means of a set screw 17 is the rear end of a tube 18, the forward end 19 of which is bent at a slight angle, and is interiorly screw threaded.

20 designates the fixed jaw of my improved tool, which is U-shaped in cross section, and provided at its rear end with a tubular portion 21, which is formed at a slight angle relative to the body portion of the jaw, said tubular portion being provided with an integral screw threaded extension which is adapted to be screwed into the forward end 19 of the tube 18. A set screw 22 passes through the part 19 and engages upon the screw threaded extension of the tubular portion 21 to lock the jaw 20 to the tube 18. By forming the meeting ends of the tube 18 and jaw 20 at slight angles, said jaw, while occupying a position in approximate alinement with the tube 18, can be swung a half turn in either direction, and when so positioned, said jaw projects from the tube 18 at an angle of approximately 45°, as shown by dotted lines in Fig. 1.

Hinged to the jaw 20 is a movable jaw 23, of inverted U-shape in cross section, and arranged between the rear portions of both jaws, with its ends bearing thereon, is a spring 24, which normally holds said jaws apart. Journaled upon a pin 25, transversely arranged in the jaw 20, is a grooved roller 26, the front side of which is closed by a guard 27, and passing around said grooved roller is a short cord or cable 28, one end of which is fixed to the inside of the jaw 23, the opposite end is extended rearwardly and fixed to the forward end of a wire 29, which latter passes through the tubular rear end 21 of the jaw 20, through the tube 18, and is provided on its rear end with a ball or knob 30, which passes through the aperture 15, in the forward end of the tube 12, thus providing a detachable connection between said tube and the wire.

When my improved tool is in use, the end provided with the jaws is inserted in the stop box, or pipe, and when the stone or other obstruction has been located, it is engaged or gripped between the jaws by engaging the cross bar 14 on the rear end of the tube 12, and pulling the same toward the cross bar 2 on the handle 1, which action draws the tube 12 through the sleeve 3, in turn drawing the wire 29 through the tube 18, which action pulls upon the cord 28 so as to move the jaw 23 downwardly toward the fixed jaw 20. Should it be desired to lock the movable jaw after being closed on the obstruction, the stop 5 is moved along the handle 1 until the front edge of said stop engages against the end of the collar 13, after which the eccentric 10 is manipulated so as to lock said stop on the notched portion of the handle 4, and the entire tool carrying the obstruction between the jaws can now be lifted from the stop box outlet or tube.

To make an extra long tool, I have provided an extension section in the form of a tube 31, the forward end of which is interiorly screw threaded in order to receive the screw threaded rear end of the tube 18, and the rear end of said tube 31 is locked in the forward end of the sleeve 3 by means of the set screw 17; and, where this extension tube is employed, an extension wire 32 is also made use of, which is provided on each end with a ball 33. The meeting ends of the wires 29 and 32 are detachably united by means of a tubular connection 34, provided with a longitudinally extending slot 35 in the center of which is formed an aperture 36. This tubular connection receives the balls on the ends of the wires 29 and 32, and is located at the joint between the tubes 18 and 31.

A tool of my improved construction is light, strong, and durable, is particularly adapted for removing loose obstructions from stop boxes, sewer vents, and like tubes or recesses, and the jaws thereof can be locked on the obstruction to insure its withdrawal from the box or tube; and said tube can easily and quickly be lengthened or shortened, as desired. The connection between the lower end of the tube 18 and the fixed jaw permits said jaw to be turned to a considerable angle relative to the plane occupied by said tube 18, in order that the jaws can be manipulated to reach an obstruction beneath a shoulder or to one side of the tube or box through which the body of the tool is inserted. When the stop 5 is clamped onto the handle 1 by means of the eccentric 10, its lower end is tilted forwardly to a slight degree, thus pulling upon the tube 12 and wire 29 so as to more firmly grip the object engaged between the jaws.

I claim:—

1. A tool of the class described, comprising a tubular handle, a fixed jaw adjustably arranged at the forward end of the handle, a spring pressed jaw hinged to the fixed jaw, a jaw operating handle extending through the tubular handle for operating the hinged jaw, and a locking device adjustably mounted on the rear end of the tubular handle for engaging and holding the rear end of the jaw operating means.

2. A tool of the class described, comprising a sectional tubular handle, a fixed jaw adjustably connected to the forward end of the sectional handle, a spring pressed jaw hinged to the fixed jaw, a sectional wire passing through the tubular handle and connected at its forward end to the hinged jaw, a handle connected to the rear end of the sectional wire and operating through the rear end of the tubular handle, and an adjustable locking device arranged on the rear end of the tubular handle for engaging the handle on the rear end of the sectional wire.

3. A tool of the class described, comprising a tubular handle, a fixed jaw adjustably arranged at the forward end of said handle, a pulley arranged in said fixed jaw, a spring pressed jaw hinged to the fixed jaw, a wire passing through the tubular handle, and a flexible connection between the forward end of the wire and the hinged jaw, which flexible connection passes around the pulley on the fixed jaw.

4. A tool of the class described, comprising a tubular handle, a fixed jaw adjustably arranged at the forward end of said handle, a pulley arranged in said fixed jaw, a spring pressed jaw hinged to the fixed jaw, a wire passing through the tubular handle, a flexible connection between the forward end of the wire and the hinged jaw, which flexible connection passes around the pulley on the fixed jaw, a handle fixed to the rear end of the wire, and an adjustable locking device arranged on the rear end of the tubular handle for engaging the handle fixed to the wire.

In testimony whereof, I have signed my name to this specification, in presence of two subscribing witnesses.

LEONARD D. PUTNEY.

Witnesses:
M. P. SMITH,
E. L. WALLACE.